(12) United States Patent
O'Donnell et al.

(10) Patent No.: US 6,554,527 B1
(45) Date of Patent: Apr. 29, 2003

(54) MOUNTING ASSEMBLY (75) Inventors: John Malcolm O'Donnell, Mosman Park (AU); Brian Sorensen, Perth (AU)

(73) Assignee: Altronic Distributors Pty. Ltd., Perth (AU)

( * ) Notice: Subject to any disclaimer, the term of this patent is extended or adjusted under 35 U.S.C. 154(b) by 0 days.

(21) Appl. No.: 09/674,408

(22) PCT Filed: May 13, 1999

(86) PCT No.: PCT/AU99/00363
§ 371 (c)(1),
(2), (4) Date: Dec. 29, 2000

(87) PCT Pub. No.: WO99/58032
PCT Pub. Date: Nov. 18, 1999

(30) Foreign Application Priority Data

May 13, 1998 (AU) .............................................. PP 3496

(51) Int. Cl.[7] .......................... A47G 29/00; F16M 13/02
(52) U.S. Cl. ....................................... 403/353; 403/375
(58) Field of Search ................................. 248/214, 694; 403/331, 345, 353, 363, 375, 383, 326, 321, 319, 325

(56) References Cited

U.S. PATENT DOCUMENTS

| 4,158,450 A | * | 6/1979 | Suzuki | ............................ 248/1 |
| 5,044,588 A | * | 9/1991 | Gunter | ......................... 248/214 |
| 5,465,927 A | * | 11/1995 | Chun-Jung | ................... 248/271 |

FOREIGN PATENT DOCUMENTS

| CA | 2073900 A | * | 1/1993 |
| JP | 08061771 A | * | 3/1996 |
| JP | 09299218 A | * | 11/1997 |
| WO | 96/02170 A | * | 2/1996 |

* cited by examiner

Primary Examiner—Christopher J. Novosad
(74) Attorney, Agent, or Firm—Dougherty, Clements & Hofer (57) ABSTRACT

A mounting assembly, having a first portion adapted to be mounted on the surface, the first portion presenting a first plane, a second portion adapted to be fastened to an object such as a speaker, the second portion presenting a second plane, and connectors for releasably connecting the second portion to the first portion in a connected condition with the first and second planes in engagement, the connectors releasably connecting the first and second portions by relative movement of the first and second planes towards each other and then movement of the first and second portions relative to each other along the contacting planes.

15 Claims, 9 Drawing Sheets

MOUNTING ASSEMBLY

FIELD OF THE INVENTION

The present invention relates to a mounting assembly for mounting an object onto a surface.

The invention has been devised particularly, although not solely, for mounting objects such as loud speakers, televisions, video monitors and surveillance cameras onto walls.

BACKGROUND ART

Objects such as loud speakers are commonly mounted onto walls by way of mounting brackets. The mounting procedure can be cumbersome as it generally involves either (a) first mounting the bracket to the wall and then securing the object to the bracket or (b) first securing the bracket to the object and then mounting the bracket to the wall. In either case, it is necessary to support the weight of the object during either attachment of the bracket to the object or mounting of the bracket to the wall. Furthermore, with such mounting brackets, it can be difficult to remove the object from the wall when and as necessary for servicing or replacement.

DISCLOSURE OF THE INVENTION

It would be advantageous to provide a mounting arrangement which allows such an object to be mounted onto a wall, and conveniently removed from the wall, as required without the need to support the weight of the object during installation of the mounting arrangement onto either the wall or the object.

The present invention provides a mounting assembly for mounting an object onto a surface, the mounting assembly comprising a first portion adapted to be mounted on the surface, the first portion presenting a first plane, a second portion comprising a body and a mount structure adapted to support an object, the second portion presenting a second plane, and connection means for releasably connecting the second portion to the first portion in a connected condition with the first and second planes in engagement, the connection means releasably connecting the first and second portions by relative movement of the first and second planes towards each other and then movement of the first and second portions relative to each other along the contacting planes, the mount structure comprises a mounting shaft supported by the body through a ball and socket joint. The body may include a mechanism operable to releasably lock the shaft in a selected angular position with respect to the body.

The connection means may comprise a spigot projecting from one of first and second portions for engagement in a slotted aperture in the other of the first and second portions, the spigot having a shank and a head at the free end of the shank, the head being enlarged with respect to the shank, the slotted aperture being dimensioned to receive the shank while preventing the head from passing therethrough, the slotted aperture having an opening at one end thereof to receive the head and shank of the spigot upon movement of the two planes together whereupon the shank can be received in the slotted aperture upon said relative movement of the two portions along the contacting planes thereby to releasably connect the first and second portions together.

The first portion may comprise a base adapted to be attached to the surface by way of fastenings such as screws.

The ball and socket joint allows the angular position of the shaft to be selectively adjusted.

A releasable locking means may be provided for releasably securing the first and second portions in the connected condition. The releasable locking means may comprise a catch operating between the first and second portions.

A further locking means may be provided for more securely locking the first and second portions together. The further locking means may comprise a locking screw extending between the first and second portions thereby to secure such portions together.

Preferably, there are a plurality of spigots and a plurality of corresponding slotted apertures.

Conveniently, the slotted apertures are incorporated in the first portion defining the base and the spigots are incorporated in the second portion defining the mount structure.

The slotted aperture may be in the form of a key hole opening whereby the enlarged portion of the key hole opening defines said opening into which the spigot can be received.

BRIEF DESCRIPTION OF THE DRAWINGS

The invention will be better understood by reference to the following description of one specific embodiment thereof as shown in the accompanying drawings of which.

BEST MODE(S) FOR CARRYING OUT THE INVENTION

Referring to the drawings, the mounting assembly 10 has been designed for mounting a loud speaker (not shown) onto a wall (also not shown).

The mounting assembly 10 comprises a first portion 11 defining a base adapted to be mounted onto the wall and a second portion 12 onto which the loud speaker is mounted and which is adapted to be releasably connected to the first portion 11.

The first portion 11 defining the base comprises a body 13 having a side wall 15, a front wall 17 and a rear wall 20. The front wall 17 has a front face 18 defining a first plane 19, the purpose of which will be explained later. The side walls 15 may be adapted to form a passage for wires to pass therethrough. This may be in the form of knock out sections 98 suitably located.

Mounting apertures 16 are provided in the body 13 to receive fastening such as screws for fixing the body onto the wall.

The second portion 12 defining the mount structure includes a body 21 having a rear face 23. The rear face 23 defines a second plane 25, the purpose of which will also be explained later.

A connection means 27 is provided for releasably connecting the second portion 12 to the first portion 11 thereby to mount the loud speaker onto the wall. The connection means 27 comprises a plurality of spigots 29 mounted on the second portion 12 and projecting from the rear face 23 thereof for engagement with a plurality of corresponding key hole openings 31 formed in the front wall 17 of the first portion 11.

Each spigot 29 comprises a shank 33 and a head 35 at the free end of the shank The head 35 is generally circular when viewed along the length of the spigot 29 and is enlarged with respect to the shank 33. The head 35 has an inner face 36 adjacent the shank. The shank 33 has two opposed flanks 37 which are parallel with respect to each other.

Each key hole opening 31 comprises a slot portion 41 and a circular opening 43 at one end of the slot portion. The key hole openings 31 are oriented such that the slot portions 41 extends vertically when the first portion 11 is mounted onto the wall and the circular openings 43 are located at the upper ends of the slot portions.

Each circular opening 43 is of a size which receives the respective spigot 29 such that the first and second portions 11 and 12 respectively can be brought together with the first plane 19 on the first portion 11 contacting the second plane 25 on the second portion 12. The slot portion 41 of each opening 31 is of a width such that the shank 33 of the respective spigot can be received in and slide along the slot portion while not permitting the enlarged head 35 to pass through the slot portion. With this arrangement, the spigot 29 is received in the respective slot portion 31 with the flanks 37 extending along the sides of the slot portion and the inner face 36 of the head 35 locating against a surface 44 on the side of the slot opposite to the front face 18 of the front wall 17.

With this arrangement, the second portion 12 of the mounting assembly 10 can be quickly and conveniently connected to the first portion 11. The connection procedure involves (a) insertion of the spigots 29 into the respective key hole openings 31 to allow the first and second planes 19 and 25 respectively to come into contact, and then (b) sliding the second portion 12 downwardly with respect to the first portion so as to move the shanks 33 of the spigots 29 into the respective slot portions 41 of the key hole openings 31. In this way, the second portion 12 assumes a connected condition in which it is securely connected to the first portion 11 and can only be released by sliding it upwardly with respect to the first portion so as to withdraw the shanks 33 from the respective slotted portions 31 and thereafter moving the second portion 12 outwardly away from the first portion 11 so as to withdraw the spigots 29 from the circular openings 43.

Figure 1:
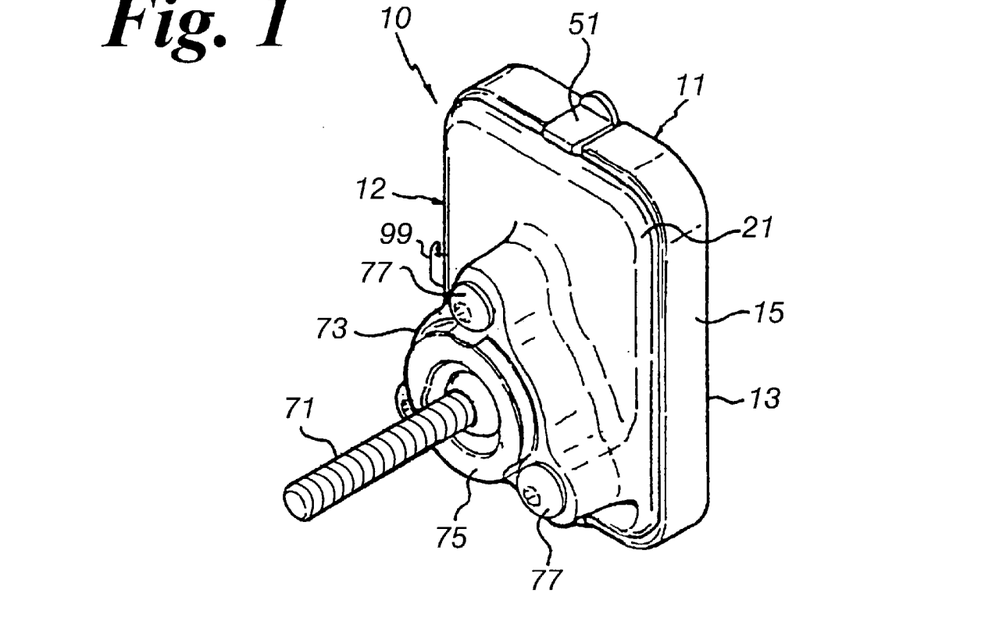
FIG. 1 is a front perspective view of the mounting assembly.
Figure 2:
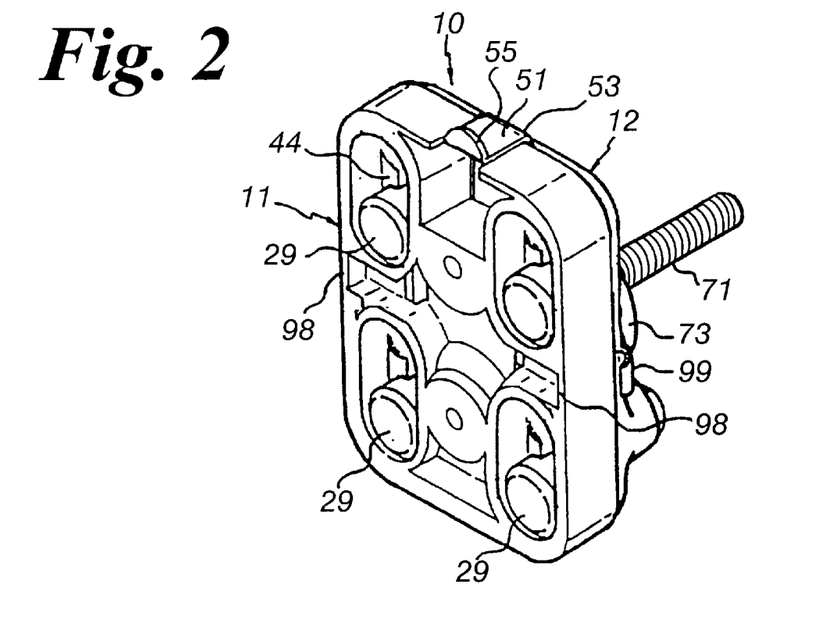
FIG. 2 is a rear perspective view of the mounting assembly.
Figure 3:
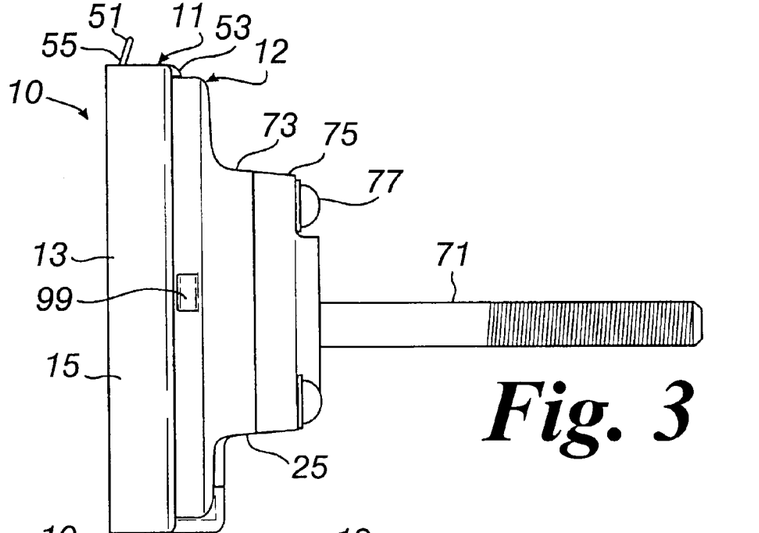
FIG. 3 is a side view of the mounting assembly.
Figure 4:
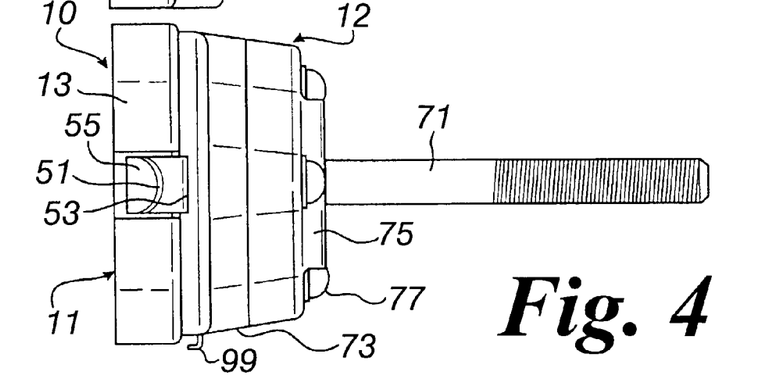
FIG. 4 is a plan view of the mounting assembly.
Figure 5:
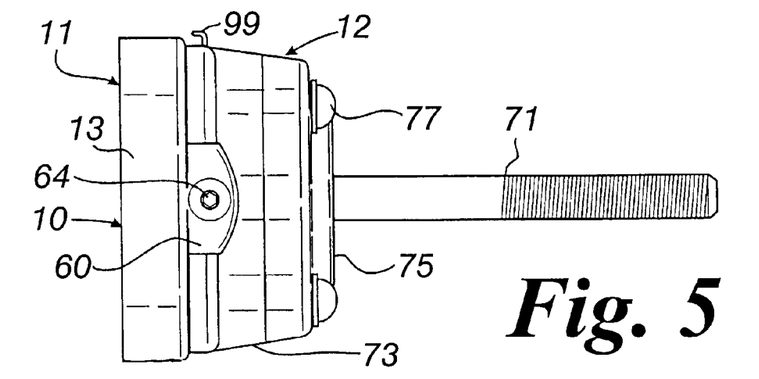
FIG. 5 is an underside view of the mounting assembly.
Figure 6:
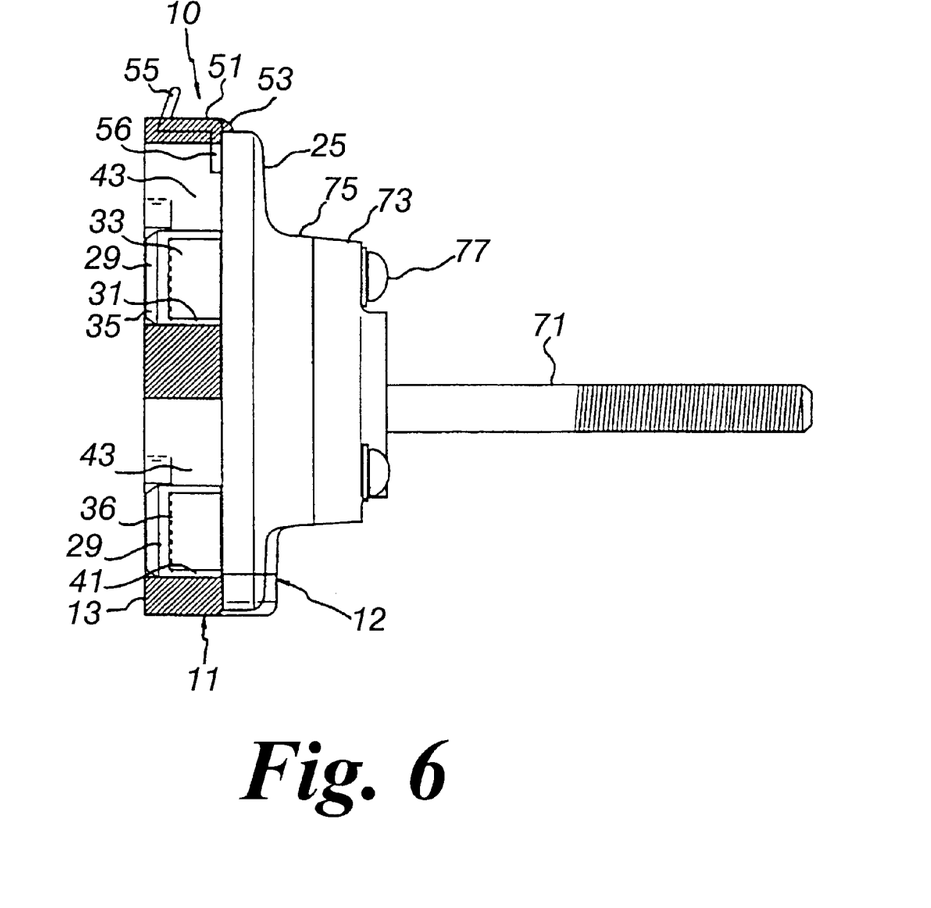
FIG. 6 is a side view of the mounting assembly with a first portion thereof shown in cross-section.
Figure 7:
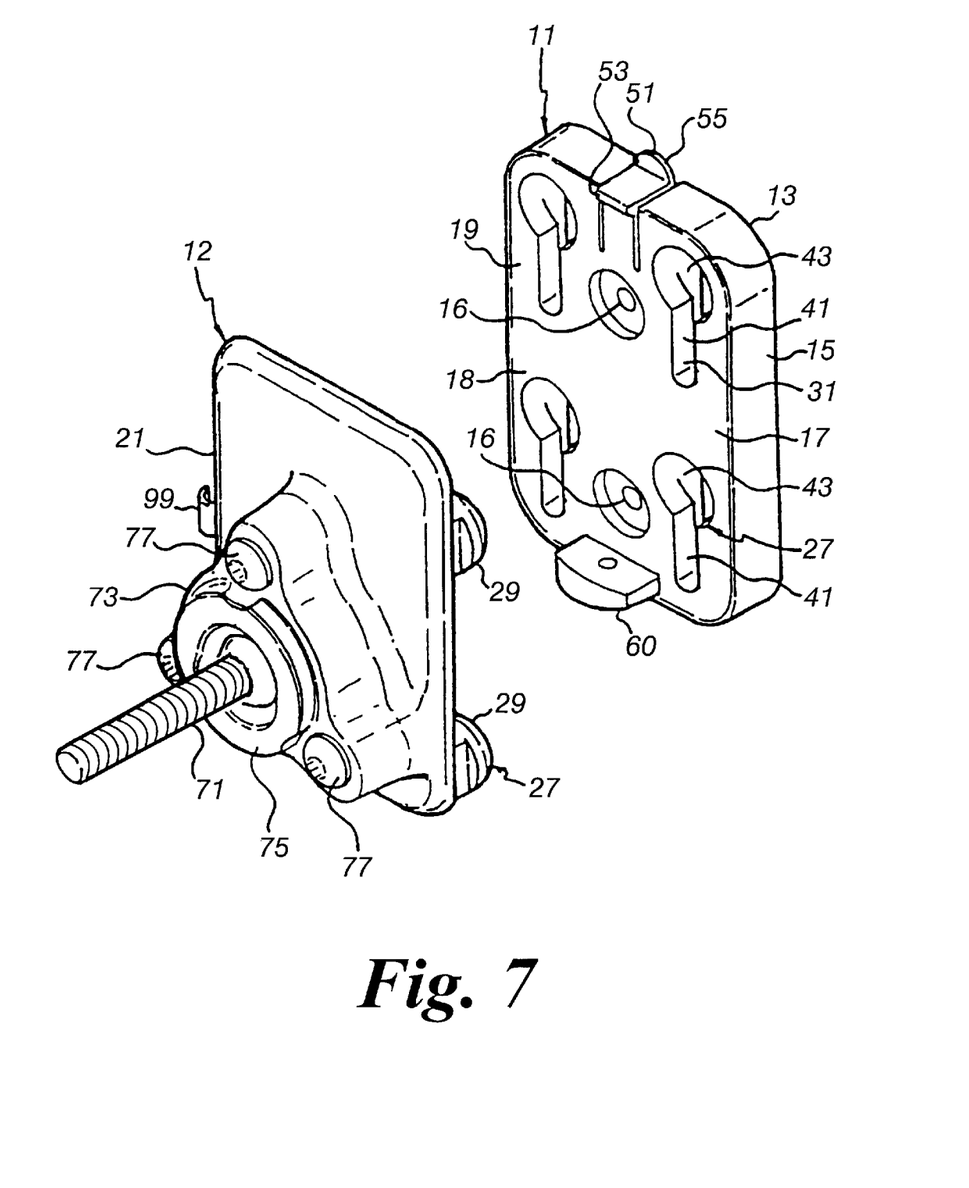
FIG. 7 is an exploded perspective view of the mounting assembly showing the first and second portions of the mounting assembly in a separated condition.
Figure 8:
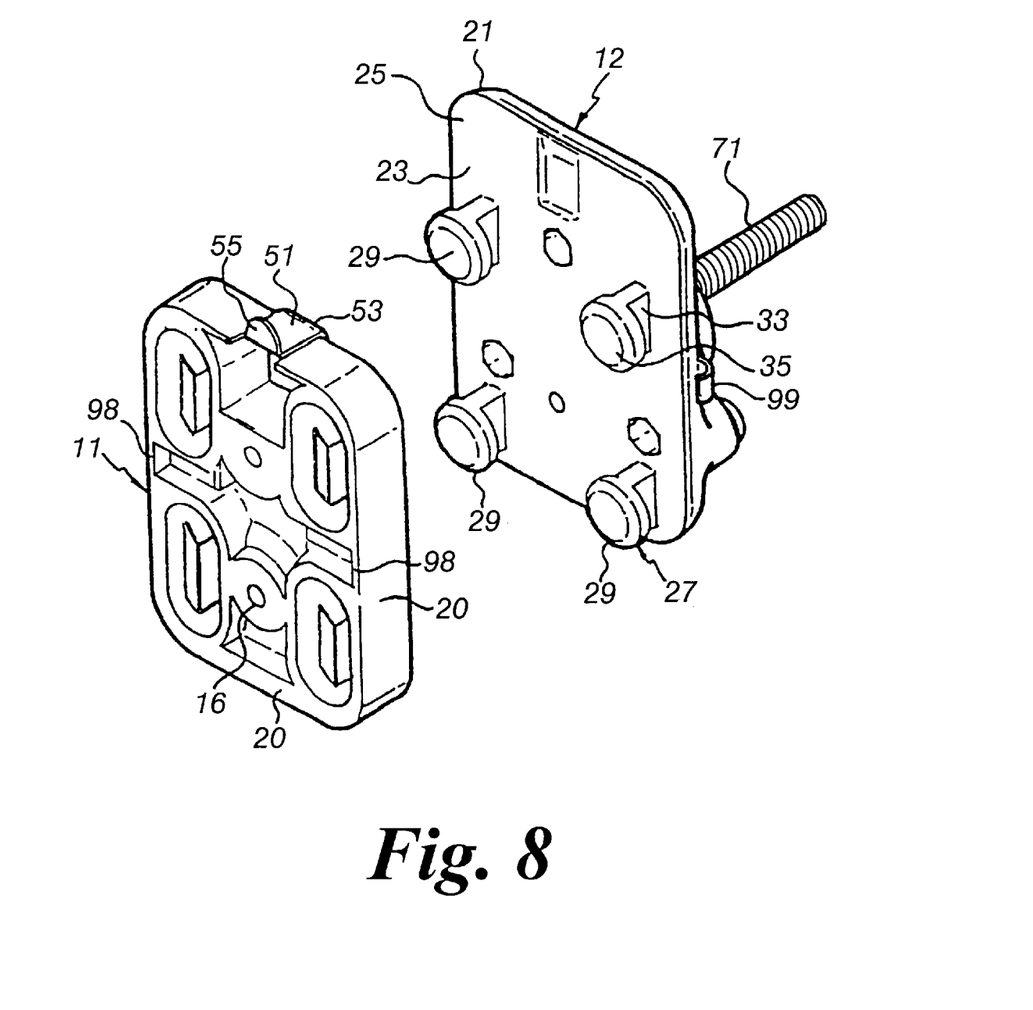
FIG. 8 is a rear perspective view of the arrangement shown in FIG. 7.
Figure 9:
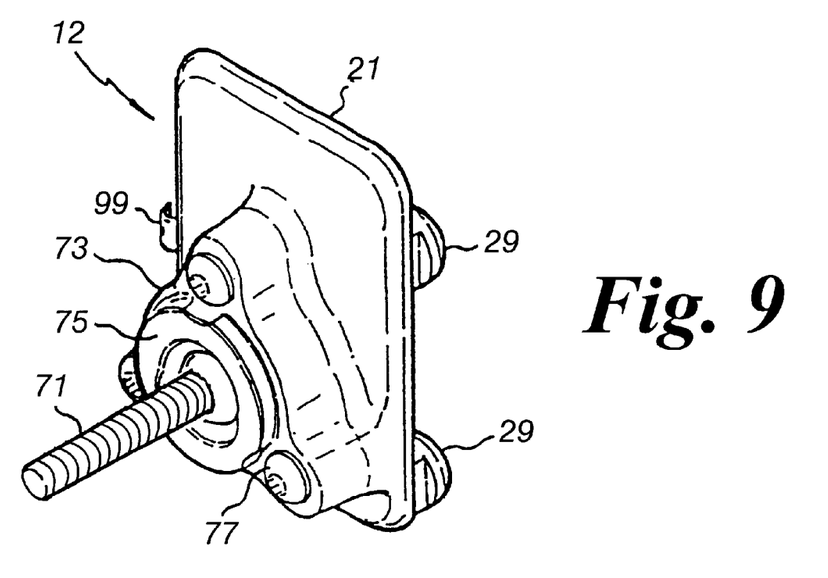
FIG. 9 is a front perspective view of the second portion of the mounting assembly.
Figure 10:
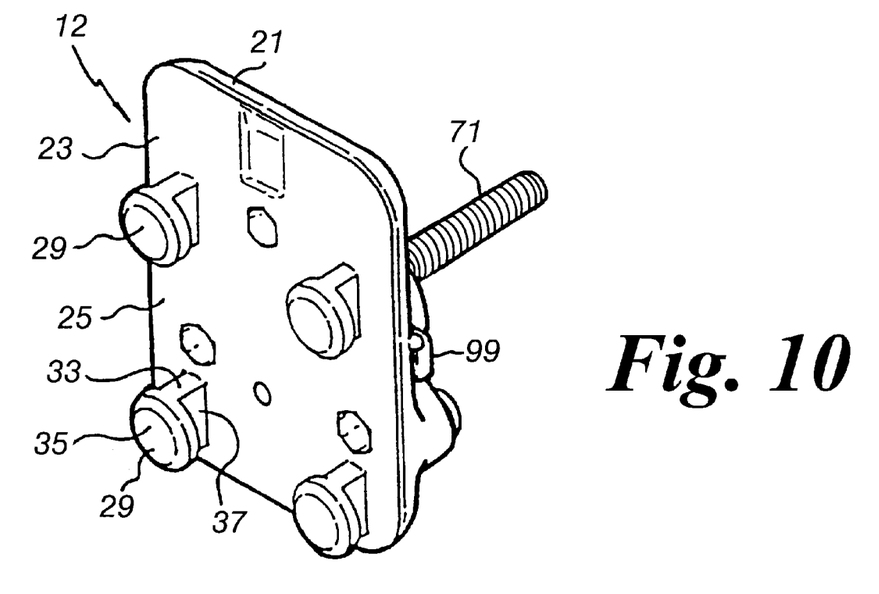
FIG. 10 is a rear perspective view of the second portion of the mounting assembly.
Figure 11:
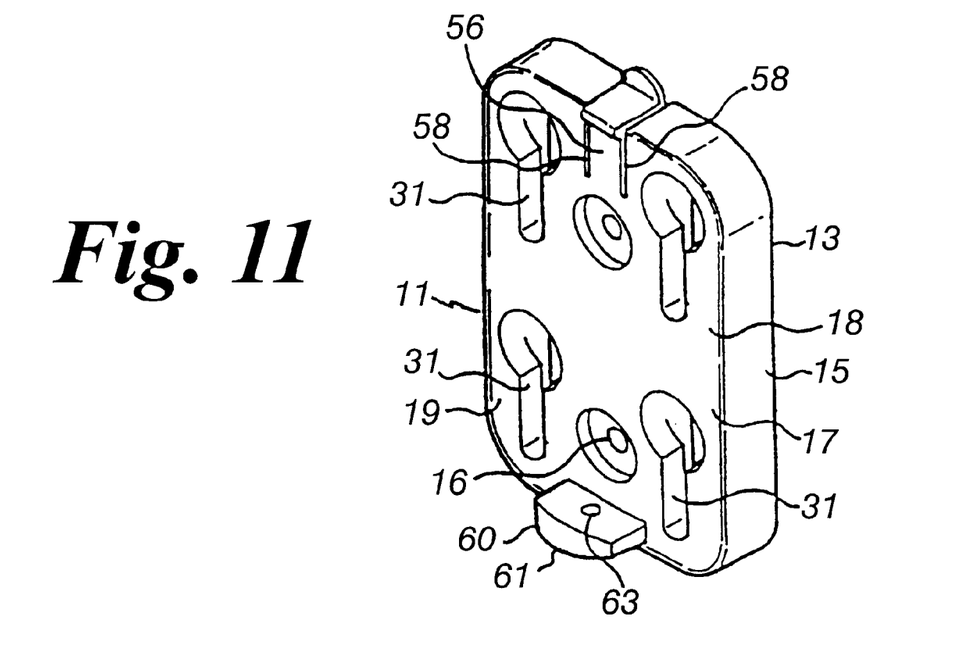
FIG. 11 is a front perspective view of the first portion of the mounting assembly.
Figure 12:
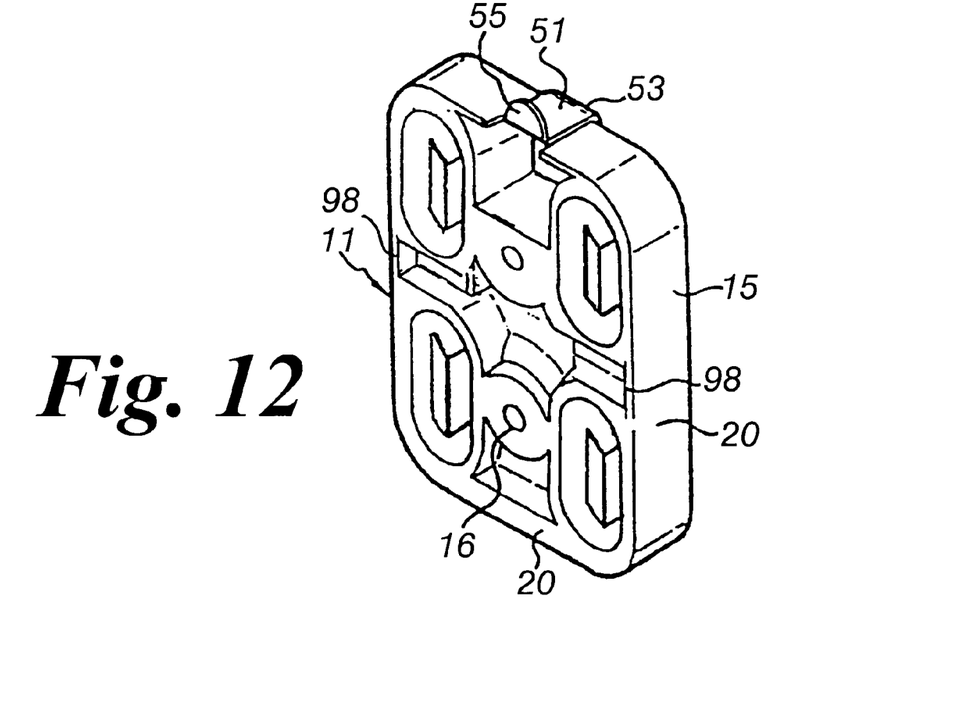
FIG. 12 is a rear perspective view of the first portion of the mounting assembly.
Figure 13:
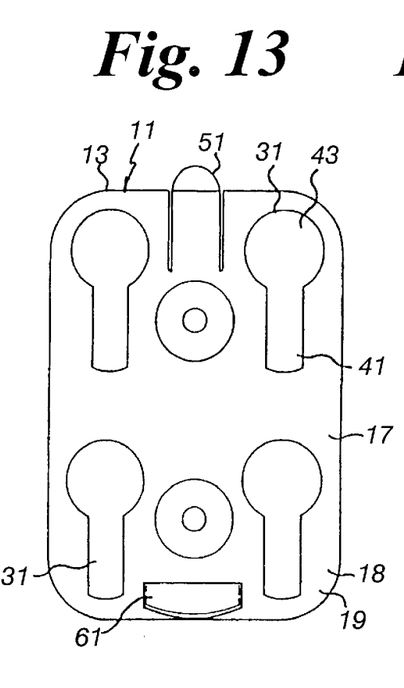
FIG. 13 is a front elevational view of the first portion of the mounting assembly.
Figure 14:
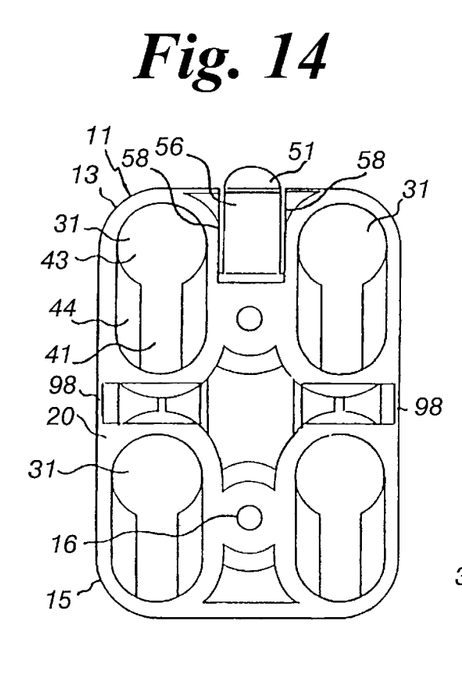
FIG. 14 is a rear perspective view of the first portion of the mounting assembly.
Figure 15:
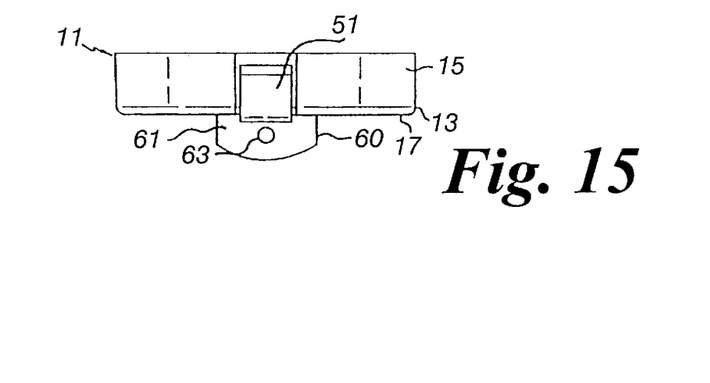
FIG. 15 is a plan view of the first portion of the mounting assembly.
Figure 16:
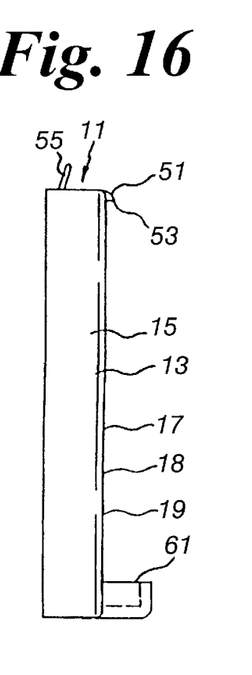
FIG. 16 is a side elevational view of the first portion of the mounting assembly.
Figure 17:
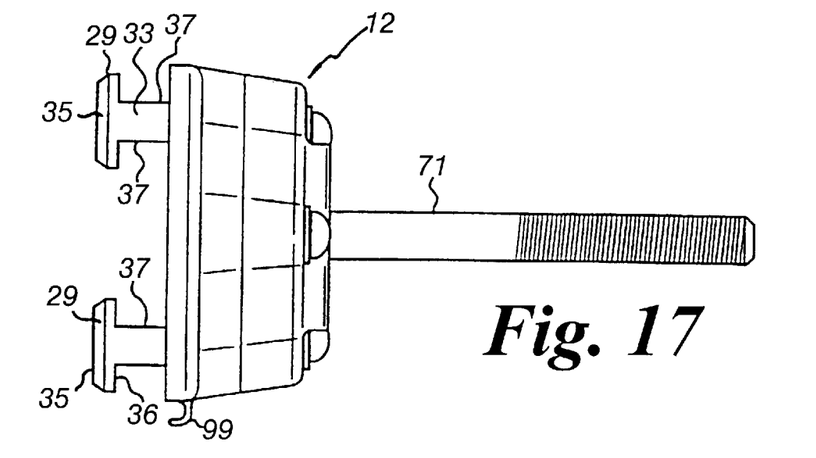
FIG. 17 is a plan view of the second portion of the mounting assembly.
Figure 18:
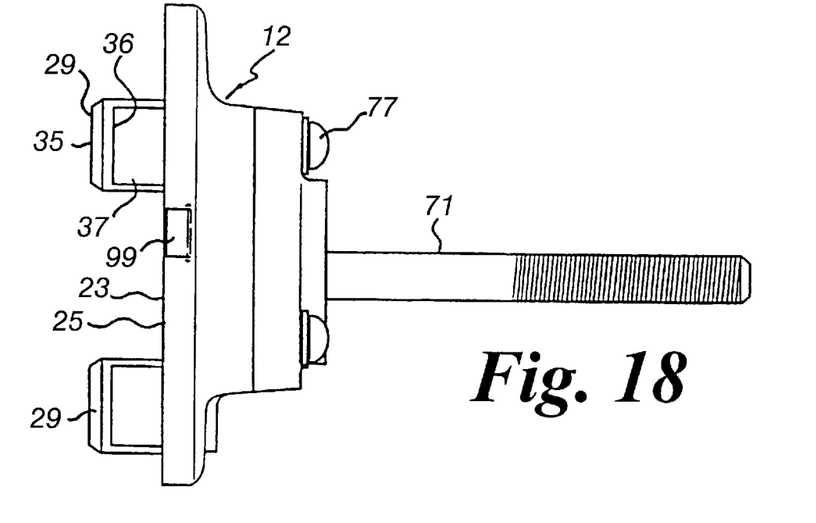
FIG. 18 is a side elevation view of the first portion of the mounting assembly.

A releasably locking means is provided for retaining the second portion 12 in the connected condition with respect to the first portion 11; The releasable locking means comprises a catch 51 which is incorporated into the body 13 of the first portion 11. The catch 51 incorporates a stop 53 which projects over the upper edge of the second portion 12 when the latter is in the connected condition on the first portion 11, as best seen in FIG. 1. The stop 53 prevents the second portion 12 from being moved upwardly in the manner described previously in order to disconnect the second portion 12 from the first portion 11. The catch 51 is biased into the locking condition but can be deflected rearwardly from that position by manual operation. In this regard, the catch 51 includes a tab 55 against which a user can apply finger pressure to move the catch from the locking condition into a released condition to allow the second portion 12 to be disconnected from the first portion 11 in the manner described previously. The catch 51 is supported on a leaf spring structure 56 which biases the catch into the locking condition. The leaf spring structure 56 is incorporated into the front wall 17 of the body 13 by forming two downwardly extending cuts 58 therein.

A further locking means 60 is provided for more securely retaining the second portion 12 in the connected condition with respect to the first portion 11 in circumstances where there may be a need to deter unauthorized removal of the speaker from the wall. This locking means 60 comprises a lug 61 formed integrally with the body 13 of the first portion 11 and against which the lower edge of the second portion 12 bears when it is in th e connected condition. The lug 61 incorporates a hole 63 through which a fastening element such as a locking screw 64 can be inserted and engaged in the second portion 12 thereby to fasten the second portion 12 to the first portion 11. With this arrangement, it would be necessary to remove the fastening element before the second portion 12 can be disconnected form the first portion 11. While such an arrangement would no t n necessarily prevent unauthorized disconnection of the second portion 12 form the first portion 11, it would at least provide a deterrent.

The mount structure defined by the second portion 12 incorporates a mounting shaft 71 to which the speaker can be connected. The mounting shaft 71 is coupled to the body 21 of the second portion 12 through a ball and socket joint (not shown) accommodated within a housing 73. With this arrangement, the threaded shaft can be moved into various positions according to the desired orientation of the speaker with respect to the wall. The housing 73 incorporates a clamping mechanism by means of which the mounting shaft 71 can be clamped in a desired angular position. The clamping mechanism comprises a clamping plate 75 which retains the ball in position in the socket and which is secured in position by way of clamping bolts 77. The clamping bolts 77 can be released slightly so as to allow angular adjustment of the position of the mounting shaft 71 and thereafter tightened to clamp the ball in the socket. The first 11 or second portion 12 has a suitable housing 99 to receive a device not shown, for releasing or securing the clamping bolts 77.

From the foregoing, it is evident that the present embodiment provides a simple yet highly effective mounting assembly by means of which a speaker can be easily mounted onto a wall. A particular benefit of the mounting assembly is that the first portion 11 can be mounted onto the wall and the second portion 12 can be separately mounted onto the speaker. Only then is it necessary to lift the speaker together with the second portion of the mounting assembly up to the first portion 11. In other words, the weight of the speaker only needs to be supported when connecting the second portion 12 of the mounting assembly to the first portion 11 of the mounting assembly; it is not necessary to support that weight during earlier installation stages. The particular constructions of the connection means allows the second portion 12 to be quickly and conveniently connected onto, and subsequently disconnected from, the first portion 11 as necessary.

It should be appreciated that the scope of the invention is not limited to the scope of the particular embodiment described. In particular, it should be understood that the mounting assembly may be used to mount objects other than loud speakers onto a wall or other surface.

Throughout the specification, unless the context requires otherwise, the word "comprise" or variations such as "comprises" or "comprising", will be understood to imply the inclusion of a stated integer or group of integers but not the exclusion of any other integer or group of integers.

What is claimed is:

1. A mounting assembly, comprising a first portion adapted to be mounted on a surface, the first portion presenting a first plane, a second portion comprising a body and a mount structure adapted to support an object, the second portion presenting a second plane, and connection means for releasably connecting the second portion to the first portion in a connected condition with the first and second planes in engagement, the connection means releasably connecting the first and second portions by relative movement of the first and second planes towards each other and then movement of the first and second portions relative to each other along the contacting planes, the mount structure having a mounting shaft supported by the body through a ball and socket joint.

2. A mounting assembly according to claim 1 wherein the connection means comprises a spigot projecting from one of said first and second portions for engagement in a slotted aperture in the other of said first and second portions.

3. A mounting assembly according to claim 2 wherein the spigot has a shank and a head at the free end of the shank.

4. A mounting assembly according to claim 3 wherein the head is enlarged with respect to the shank.

5. A mounting assembly according to claim 4 wherein the slotted aperture is dimensioned to receive the shank while preventing the head from passing therethrough.

6. A mounting assembly according to claim 5 wherein the slotted aperture has an opening at one end thereof to receive the head and shank of the spigot upon movement of the two planes together whereupon the shank can be received in the slotted aperture upon said relative movement of the two portions along the contacting planes thereby to releasably connect the first and second portions together.

7. A mounting assembly according to claim 6 wherein the first portion comprises a base adapted to be attached to the surface by way of fasteners.

8. A mounting assembly according to claim 2 wherein there are a plurality of spigots and a plurality of corresponding slotted apertures.

9. A mounting assembly according to claim 1 wherein a locking mechanism is provided for releasably locking the shaft in a selected angular position.

10. A mounting assembly according to claim 1 wherein a releasable locking means is provided for releasably securing the first and second portions in the connected condition.

11. A mounting assembly according to claim 10 wherein the releasable locking means comprises a catch operable between the first and second portions.

12. A mounting assembly according to claim 11 wherein, the slotted apertures are incorporated in the first portion defining a base and the spigots are incorporated in the second portion defining a mount structure.

13. A mounting assembly according to claim 12 wherein each slotted aperture is in the form of a key hole opening whereby the enlarged portion of the key hole opening defines said opening into which the spigot is received.

14. A mounting assembly according to claim 10 wherein a further locking means is provided for locking the first and second portions together.

15. A mounting assembley according to claim 14 wherein the further locking means comprises a locking screw extending between the first and second portions thereby to secure such portions together.

\* \* \* \* \*